Feb. 4, 1958    J. W. SCHMIDT    2,822,275
MEAT PACKAGE
Filed Sept. 30, 1955
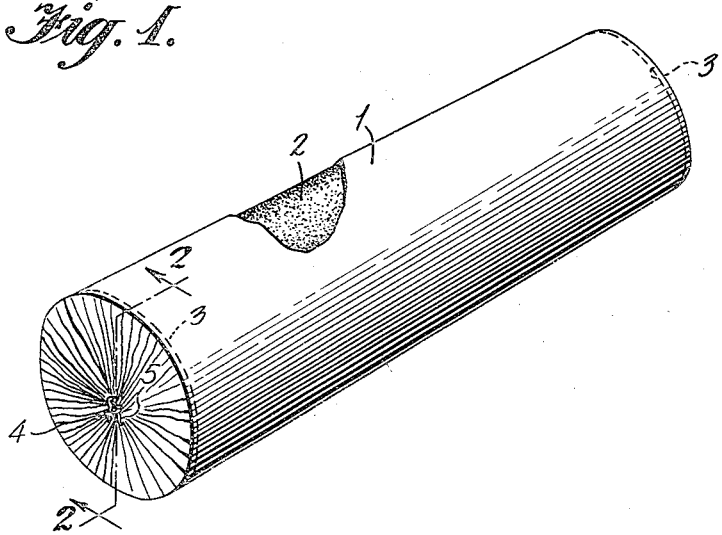
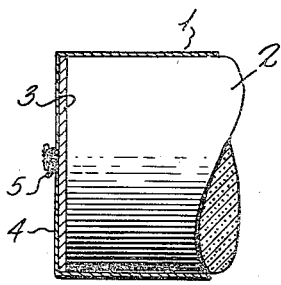
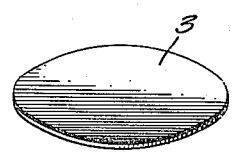
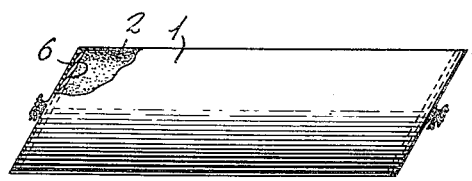
INVENTOR
John W. Schmidt
BY Mason, Fenwick & Lawrence
ATTORNEYS

United States Patent Office 2,822,275
Patented Feb. 4, 1958

2,822,275

MEAT PACKAGE

John W. Schmidt, Ottumwa, Iowa, assignor to John Morrell & Co., Ottumwa, Iowa, a corporation of Maine Application September 30, 1955, Serial No. 537,774

2 Claims. (Cl. 99—174)

This invention relates to a meat package of the type from which the meat is dispensed by slicing. In the conventional package the meat is stuffed into a suitable flexible but nonstretchable casing, the ends of the casing being then tied together so as to be distended by the pressure of the meat into a more or less convex shape.

The general object of the present invention is to provide a meat package in which the body of meat has flat ends in planes parallel to the planes of the contemplated slices, so that in slicing there will be no irregularly shaped ends to be thrown away.

A further object of the invention is to provide a meat package of the type described, in which a flat rigid disklike end piece lies contiguous to the meat mass at each end in parallel planes which in general are perpendicular to the axis of the package, the meat mass together with the end pieces, being encompassed by a tubular casing, the latter being folded radially over both disks and closed together at central points, the package being compressed sufficiently to constrict the meat mass throughout the surface.

Other objects of the invention will appear as the following description of a practical embodiment thereof proceeds.

In the drawing which accompanies and forms a part of the following specification:

Figure 1 is a perspective view of a meat package embodying the principles of the invention, part of the casing being broken away to disclose the meat;

Figure 2 is a longitudinal section taken along the line 2—2 of Figure 1;

Figure 3 is a perspective view of one of the end pieces;

Figure 4 is a side elevation of a slightly modified form of the invention.

Referring now in detail to the drawings, the numeral 1 represents a tubular casing which may be a natural intestinal lining or a functional equivalent therefor. The casing is characterized by being fibrous, flexible, but substantially nonstretchable. Customarily, the tubular casing is first tied together at one end, then stuffed with meat under some pressure until the closed end is convexly distended. The casing is slightly over-stuffed so that when the other end is brought together over the meat and closed, both ends will be similarly convex. In vending sliced meat from such a package, the butcher finds it necessary to first cut off the anterior convex end and discard it, for this end cannot be sliced to advantage, and the public has no use for it. Likewise, the convex rear end portion must also be discarded. The present invention proposes a meat package in which there will be no convex or irregularly shaped ends, but every bit of the meat will be susceptible to being sliced into perfect and similar slices.

The package shown in Figure 1 represents a rolled and boned ham, the meat being shown at 2. In this case, the tubular casing is closed at one end in the line of its axis by tying or clamping the casing together. Then a rigid substantially planiform end piece 3 of sheet material is placed in the casing in a diametrical plane, that is to say, coaxial with the casing. As shown in the drawing the end piece or disk 3 is flat and planiform throughout, on both sides, and of uniform thinness. The meat is then stuffed into the casing under some pressure, the effect of which is to push the disk 3 down into the casing until the end portion of the casing lies flat against the disk 3. The anterior end portion is not visible from the perspective view in Figure 1, but when the meat is properly stuffed under pressure within the casing, the end of the casing lies flat against the end piece 3 similarly to the showing of the opposite end 4 of the casing. After the casing has been fully stuffed, a similar disk 3 is placed against the meat at the outer end of the package in a position perpendicular to the axis of the package, that is, parallel to the other disk 3. The end portion 4 of the casing which extends beyond the last named disk is gathered together tightly. The tension developed in the act of tightly gathering draws the end portion of the casing abruptly inward over the circumference of the disk toward the center of the disk from all points in its circumference until the said end portion lies substantially contiguous to the disk, and in this tightly gathered condition it is held by the tie or clamp 5, which constrictively embraces the closely gathered margin of the end portion.

As stated above, and as shown in Figures 1 and 2, both ends of the package, in the finished article are alike, the tension being developed in one instance through the pressure of the body of meat being stuffed into the casing, and at the other end by the act of gathering the end portion tightly together subsequent to stuffing. The force of the stuffing may be counted upon to expand the intermediate part of the casing somewhat, although it is described as being substantially nonstretchable. The package is now put in a suitable press and the sides of the package subjected to pressure, which forces the meat to contact every part of the inner surface of the casing and to make good surface contact with both of the disks 3. Prior to the application of pressure, it is advisable to puncture the casing to exhaust any air which may have become entrapped in stuffing the casing.

In dispensing sliced meat from this package, the butcher first cuts through the casing in the plane of the inner face of the end piece 3 which is at the outer end of the package, and discards this end piece. He then slices the meat, and finally, arrives at the plane of the inner face of the other end piece 3, which is then discarded, no meat being lost.

In general, the meat will be sliced in planes perpendicular to the axis of the package, and consequently, the end pieces 3 will also be in planes perpendicular to said axis. In some instances butchers prefer to slice the meat in an inclined plane with respect to the axis of the roll, so as to obtain oval slices. Where such inclined slicing is contemplated, the package may be modified to the extent that the end faces of the meat body are in planes inclined to the axis of the package and the end pieces similarly inclined. Such modification is indicated in Figure 4, in which the end pieces 6 are parallel but inclined at the angle of the contemplated slicing.

While I have in the above description disclosed what I believe to be a practical embodiment of the invention, it will be understood by those skilled in the art that the specific details of construction and arrangement of parts, as shown, are by way of example and not to be construed as limiting the scope of the invention.

What I claim is:

1. Meat package comprising a body of meat of uniform cross-section having end faces in parallel planes, thin flat rigid members in sheet form of uniform thickness fitting said end faces congruently in surface contact therewith and a flexible tubular casing having an intermediate portion constrictively surrounding the meat body, and end portions bent abruptly inward about all points in the peripheries of said rigid members toward the centers of said members so as to enclose said members, said end portions of said casing lying substantially contiguous to said rigid members under tension, and means adjacent the centers of said members tying together under tension the gathered ends of said end portions, constrictively encompassing the margins thereof for holding said end portions closed under tension.

2. Meat package comprising a cylindrical body of meat having end faces in parallel planes, thin flat rigid disks in sheet form of uniform thickness fitting said end faces congruently in surface contact therewith, and a flexible tubular casing having an intermediate portion constrictively surrounding the meat body, and end portions bent abruptly inwardly about all points in the peripheries of said disks toward the centers of said disks so as to enclose said disks, said end portions lying substantially contiguous to said disks under tension, and means adjacent the centers of said disks tying together under tension the gathered ends of said end portions, constrictively encompassing the margins thereof for holding said end portions closed under tension.

References Cited in the file of this patent

UNITED STATES PATENTS

| | | |
|---|---|---|
| 2,523,436 | Klaus | Sept. 26, 1950 |
| 2,751,306 | Snyder | June 19, 1956 |